United States Patent
Clark (10) Patent No.: US 11,763,190 B2
(45) Date of Patent: Sep. 19, 2023

(54) ABSTRACTED INTERFACE FOR GAMIFICATION OF MACHINE LEARNING ALGORITHMS

(71) Applicant: Balanced Media Technology, LLC, McKinney, TX (US)

(72) Inventor: Corey Clark, Plano, TX (US)

(73) Assignee: Balanced Media Technology, LLC, McKinney, TX (US)

( * ) Notice: Subject to any disclaimer, the term of this patent is extended or adjusted under 35 U.S.C. 154(b) by 1160 days.

(21) Appl. No.: 16/365,647

(22) Filed: Mar. 26, 2019

(65) Prior Publication Data

US 2019/0294922 A1    Sep. 26, 2019

Related U.S. Application Data

(60) Provisional application No. 62/648,198, filed on Mar. 26, 2018.

(51) Int. Cl.
*G06K 9/62*    (2022.01)
*G06N 20/00*    (2019.01)
(Continued)

(52) U.S. Cl.
CPC ......... *G06N 20/00* (2019.01); *G06F 18/2178* (2023.01); *G06F 18/41* (2023.01)

(58) Field of Classification Search
CPC ..... G06K 9/6254; G06K 9/6263; G06N 20/00
(Continued)

(56) References Cited

U.S. PATENT DOCUMENTS

| 2004/0049479 A1* | 3/2004 | Dorne | G06Q 10/0631 |
| 2005/0130109 A1* | 6/2005 | Kirshenbaum | G09B 7/00 434/322 |

(Continued)

FOREIGN PATENT DOCUMENTS

| JP | 2007312848 A | 12/2007 |
| JP | 2013084175 A | 5/2013 |

(Continued)

OTHER PUBLICATIONS

Von Ahn et al., "Labeling Images with a Computer Game", Proceedings of the SIGCHI Conference on Human Factors in Computing Systems (CHI '04), Apr. 2004, pp. 319-326.

(Continued)

*Primary Examiner* — Jeffery A Williams (57) ABSTRACT

Methods, systems, and media for interactive machine learning. The method includes iteratively performing a process including steps of identifying a solution to a given problem; processing, based on determining that the identified solution is a possible solution to the given problem, the possible solution by running a machine learning application using the possible solution; selecting a processed solution based on a plurality of processed solutions at least a portion of which are from different iterations of the process; and determining whether to exit the process with the selected solution for the given problem based on an exit condition. Performing the process includes receiving, via a user interface for an interactive application, inputs into the interactive application to use in performing at least part of one of the steps.

17 Claims, 4 Drawing Sheets

(51) Int. Cl.
 G06F 18/40 (2023.01)
 G06F 18/21 (2023.01)
(58) Field of Classification Search
 USPC .......................................................... 706/12
 See application file for complete search history.

(56) References Cited

U.S. PATENT DOCUMENTS

| | | |
|---|---|---|
| 2006/0195508 A1 | 8/2006 | Bernardin et al. |
| 2008/0154917 A1 | 6/2008 | Gounares et al. |
| 2012/0225721 A1 | 9/2012 | Holder et al. |
| 2013/0079128 A1 | 3/2013 | Thomas et al. |
| 2013/0229333 A1 | 9/2013 | Schwartz et al. |
| 2014/0270108 A1 | 9/2014 | Riahi et al. |
| 2015/0126286 A1 | 5/2015 | Guo |
| 2015/0190709 A1 | 7/2015 | Moorthy et al. |
| 2016/0162783 A1 | 6/2016 | Tan et al. |
| 2018/0349783 A1 | 12/2018 | Pouyllau |

FOREIGN PATENT DOCUMENTS

| | | |
|---|---|---|
| JP | 2014157605 A | 8/2014 |
| WO | 2017019530 A1 | 2/2017 |
| WO | 2017089443 A1 | 6/2017 |

OTHER PUBLICATIONS

Bonney et al., "Citizen Science: A Developing Tool for Expanding Science Knowledge and Scientific Literacy", BioScience, vol. 59, No. 11, Dec. 2009, pp. 977-984.
Boyle et al., "Engagement in digital entertainment games: A systematic review", Computers in Human Behavior, vol. 28, No. 3, May 2012, pp. 771-780.
Cooper et al., "Predicting protein structures with a multiplayer online game", Nature, vol. 466, Aug. 2010, pp. 756-760.
Deterding et al., "Gamification: Using Game Design Elements in Non-Gaming Contexts", Proceedings of CHI '11 Extended Abstracts on Human Factors in Computing Systems (CHI EA '11), May 2011, pp. 2425-2428.
Mason et al., "Tiger Nation: Empowering Citizen Scientists", 2012 6th IEEE International Conference on Digital Ecosystems and Technologies (DEST), Jun. 2012, 5 pages.
Mazumdar et al., Citizen Science and Crowdsourcing for Earth Observations: An Analysis of Stakeholder Opinions on the Present and Future, Remote Sensing, vol. 9, No. 1, Jan. 2017, 21 pages.
Michelucci et al., "A U.S. Research Roadmap for Human Computation: A Community Report from the 2014 Human Computation Roadmap Summit", Computing Community Consortium Technical Report, 2015, 32 pages.
Peplow, "Citizen science lures gamers into Sweden's Human Protein Atlas", Nature Biotechnology, vol. 34, No. 5, May 2016, pp. 452-453.
Sørensen et al., "Exploring the Quantum Speed Limit with Computer Games", Nature, vol. 532, Apr. 2016, 18 pages.
ISA/US, "International Search Report and Written Opinion of the International Searching Authority," International Application No. PCT/US2019/024157, dated Jun. 20, 2019, 11 pages.
Extended European Search Report regarding Application No. 19777081.1, dated Nov. 4, 2021, 12 pages.
Fava et al., "Crowdsourcing Program Preconditions via a Classification Game", 2016 IEEE/ACM 38th IEEE International Conference on Software Engineering, May 2016, pp. 1086-1096.
Cusack et al., "Volunteer Computing Games: Merging Online Casual Gaming with Volunteer Computing", Meaningful Play 2008 Conference Proceedings, Oct. 2008, 34 pages.
Cusack et al., "Volunteer Computing Using Casual Games", Proceedings of Future Play 2006 International Conference on the Future of Game Design and Technology, Oct. 2006, 8 pages.
Allen, "Do-it-yourself climate prediction", Nature, vol. 401, Oct. 1999, p. 642.
Anderson, "Boinc: A System for Public-Resource Computing and Storage", Proceedings of the 5th IEEE/ACM International Workshop on Grid Computing (GRID '04), Nov. 2004, pp. 4-10.
Anderson et al., "SETI@home: An Experiment in Public-Resource Computing", Communications of the ACM, vol. 45, No. 11, Nov. 2002, pp. 56-61.
Eiben et al., "Increased Diels-Alderase activity through backbone remodeling guided by Foldit players", Nature Biotechnology, vol. 30, No. 2, Feb. 2012, pp. 190-192.
Hand, People power: Networks of human minds are taking citizen science to a new level, Nature, vol. 466, Aug. 2010, pp. 685-687.
Heien et al., "Computing Low Latency Batches with Unreliable Workers in Volunteer Computing Environments", Journal of Grid Computing, vol. 7, Dec. 2009, pp. 501-518.
"Want to Help Cure Disease or Discover New Stars? Now You Can, Using Your Smartphone", IBM, Jul. 2016, 3 pages.
Jones, "Computer sharing loses momentum", Nature, vol. 506, Feb. 2014, 3 pages.
Kesten, "Week in video-game news: 'God of War II' storms the PS2; a PS3 research project", Pittsburgh Post-Gazette, Mar. 2007, 3 pages.
Kondo et al., "Cost-Benefit Analysis of Cloud Computing versus Desktop Grids", 2009 IEEE International Symposium on Parallel & Distributed Processing (IPDPS), May 2009, 12 pages.
Luban, "The Design of Free-To-Play Games: Part 1", Nov. 2011, 8 pages.
Medler, "Player Dossiers: Analyzing Gameplay Data as a Reward", International Journal of Computer Game Research, vol. 11, No. 1, Feb. 2011, 18 pages.
Nunneley, "Blizzard had biggest quarterly online player community in history thanks to Overwatch and World of Warcraft", Nov. 2016, 3 pages.
Pande, "Life with Playstation—a new update to the FAH/PS3 client", Folding@home, Sep. 2008, 2 pages.
Pande et al., "Atomistic Protein Folding Simulations on the Submillisecond Time Scale Using Worldwide Distributed Computing", Biopolymers, vol. 68, No. 1, Jan. 2003, pp. 91-109.
Reisinger, "Sony folds up Folding@home PS3 project after 100M hours", CNET, Oct. 2012, 2 pages.
Repetto, "Hybrid Architecture for Constructive Interactive Simulation: Evaluation and Outcomes", Interservice/Industry Training, Simulation, and Education Conference (I/ITSEC), Nov. 2010, 11 pages.
Shih, "US supercomputer needs more people power", Feb. 2017, 2 pages.
"Increase in 'active' PS3 folders pushes Folding@Home past 4 Petaflops!", Sep. 2008, 1 page.
Toth, "Volunteer Computing With Video Game Consoles", Proceedings of the 6th WSEAS Int. Conf. on Software Engineering, Parallel and Distributed Systems, Feb. 2007, pp. 102-106.
"The projects", Cancer Research UK, copyright 2017, 3 pages.
Von Ahn et al., "Peekaboom: A Game for Locating Objects in Images", Proceedings of the SIGCHI Conference on Human Factors in Computing Systems (CHI '06), Apr. 2006, pp. 55-64.
Williams, "PlayStation's serious side: Fighting Disease", CNN, Oct. 2006, 2 pages.
"Human-in-the-Loop", Figure Eight Inc., copyright 2018, 3 pages.
Markoff, "In a Video Game, Tackling the Complexities of Protein Folding", The New York Times, Aug. 2010, 3 pages.
Peel, "Citizen Scientists can spot cancer cells like pathologists, so what happens next?", Cancer Research UK, Oct. 2015, 3 pages.
Zevin, et al., "Gravity Spy: Integrating Advanced LIGO Detector Characterization, Machine Learning, and Citizen Science", Classical and Quantum Gravity, vol. 34, No. 6, Mar. 2017, available online Nov. 2016, 27 pages.
Fabisiak, et al., "Browser-Based Harnessing of Voluntary Computational Power", Foundations of Computing and Decision Sciences, vol. 42, No. 1, Feb. 2017, pp. 3-42.
Matheny, et al., "ExSci TecH: Expanding Volunteer Computing to Explore Science, Technology, and Health", 2012 IEEE 8th International Conference on E-Science, Oct. 2012, 8 pages.

(56) References Cited

OTHER PUBLICATIONS

Tuovinen, "From Machine Learning to Learning with Machines, Remodeling the Knowledge Discovery Process", Doctoral Dissertation, University of Oulu Graduate School, Department of Computer Science and Engineering, Aug. 2014, 183 pages.
Japanese Patent Office, Notice of Reasons for Refusal dated May 9, 2023 regarding Application No. 2020-552388, 5 pages.

\* cited by examiner

ABSTRACTED INTERFACE FOR GAMIFICATION OF MACHINE LEARNING ALGORITHMS

CROSS-REFERENCE TO RELATED APPLICATIONS AND CLAIM OF PRIORITY

The present application claims priority to U.S. Provisional Patent Application Ser. No. 62/648,198, filed on Mar. 26, 2018. The content of the above-identified patent documents is incorporated herein by reference.

TECHNICAL FIELD

This disclosure relates generally to processing of machine learning (ML) algorithms with user interaction. More specifically, this disclosure relates to an abstracted interface for gamification of machine learning algorithms.

BACKGROUND

A number of researchers have turned to games and game-like activities to approach their research through crowd-sourced research or citizen science (CS) (also called human computing (HC). CS research techniques allow researchers to access a vast potential network of volunteer citizen scientists who are interested to help scientific research. CS games, such as Foldit™, turn the scientific problem into a game. Many CS games have proven to successfully generate interest, provide valuable data analysis, and generate creative solutions to scientific problems. Despite the potential of these CS games, CS games have not found success and engagement on the level of commercial video games.

BRIEF DESCRIPTION OF THE DRAWINGS

For a more complete understanding of the present disclosure and its advantages, reference is now made to the following description taken in conjunction with the accompanying drawings, in which like reference numerals represent like parts.

SUMMARY

Embodiments of the present disclosure provide for interactive machine learning, abstracted interface for gamification of machine learning algorithms, and/or constructivist-augmented machine learning.

In one embodiment, a method for interactive machine learning is provided. The method includes iteratively performing a process including steps of identifying a solution to a given problem; processing, based on determining that the identified solution is a possible solution to the given problem, the possible solution by running a machine learning application using the possible solution; selecting a processed solution based on a plurality of processed solutions at least a portion of which are from different iterations of the process; and determining whether to exit the process with the selected solution for the given problem based on an exit condition. Performing the process includes receiving, via a user interface for an interactive application, inputs into the interactive application to use in performing at least part of one of the steps.

In another embodiment, a system for interactive machine learning is provided. The system includes a processor and a communication interface operably connected to the processor. The processor is configured to iteratively perform a process including steps of identifying a solution to a given problem; processing, based on determining that the identified solution is a possible solution to the given problem, the possible solution by running a machine learning application using the possible solution; selecting a processed solution based on a plurality of processed solutions at least a portion of which are from different iterations of the process; and determining whether to exit the process with the selected solution for the given problem based on an exit condition. The communication interface is configured to receive, via a user interface for an interactive application, inputs into the interactive application to use in performance of at least part of one of the steps.

In another embodiment, a non-transitory, computer-readable medium for interactive machine learning is provided. The computer-readable medium includes program code that, when executed by a processor of a system, causes the system to iteratively perform a process including steps of identifying a solution to a given problem; processing, based on determining that the identified solution is a possible solution to the given problem, the possible solution by running a machine learning application using the possible solution; selecting a processed solution based on a plurality of processed solutions at least a portion of which are from different iterations of the process; and determining whether to exit the process with the selected solution for the given problem based on an exit condition. The computer-readable medium further includes program code that, when executed by the processor of a system, causes the system to receive, via a user interface for an interactive application, inputs into the interactive application to use in performance of at least part of one of the steps.

Other technical features may be readily apparent to one skilled in the art from the following figures, descriptions, and claims.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure recognize that having researchers attempt to become experts in video game design and development or create customized games for each scientific problem can be costly. Various embodiments of the present disclosure also recognize that despite the ability of some CS games to solve scientific problems, these games lack the engagement of mainstream video games. With low engagement, the usefulness of custom created CS games does not reach full potential.

Accordingly, various embodiments of the present disclosure provide a solution to connect scientific research to existing and/or successful commercial video games. Embodiments of the present disclosure provide a mechanism for researchers to take advantage of mainstream video games in a more general form. In particular, various embodiments of the present disclosure provide a framework for an interface between video games (or more generally interactive entertainment), machine learning, and problems (for example, such as, machine learning problems, scientific problems related to research and development).

Embodiments of the present disclosure also provide an interface to utilize crowd-sourcing or CS techniques to improve and interact with machine learning. Embodiments of the present disclosure provide for motivating and empowering massive online communities, such as gaming communities, to use the hours they already spend playing games towards helping process critical problems that help create a better world.

As used herein, use of the term video games or games is intended as an example and embodiments of the present disclosure can be implemented in any type of interactive application. Also as used herein, problems refer to any type of problem that can be processed or solved using machine learning or computer processing, including improvement or modification of the machine learning model itself as well as scientific problems related to research and development.

Figure 1:
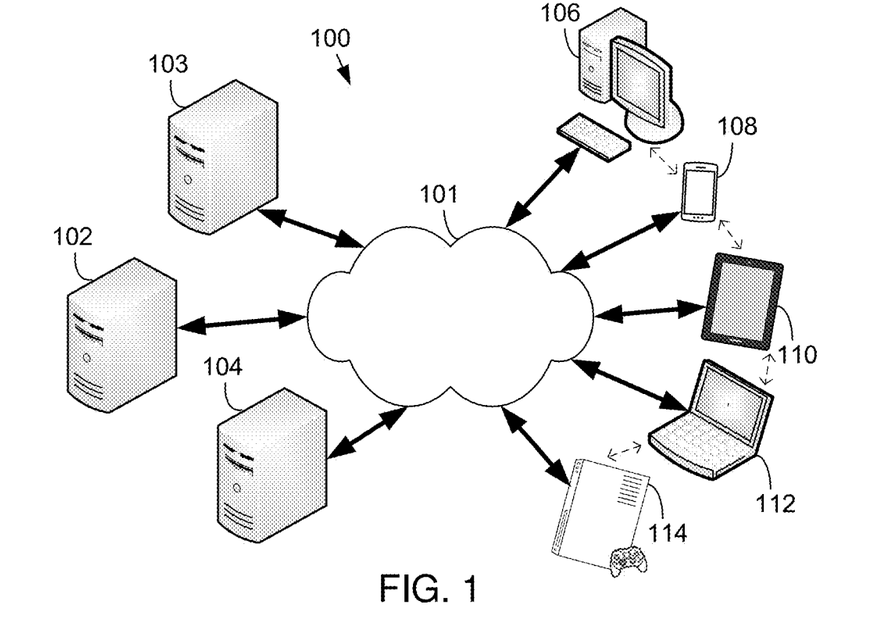
FIG. 1 illustrates an example networked system in which various embodiments of the present disclosure may be implemented.

FIG. 1 illustrates an example networked system 100 in which various embodiments of the present disclosure may be implemented. The embodiment of the networked system 100 shown in FIG. 1 is for illustration only. Other embodiments of the networked system 100 could be used without departing from the scope of this disclosure.

As shown in FIG. 1, the system 100 includes a network 101, which facilitates communication between various components in the system 100. For example, the network 101 may communicate Internet Protocol (IP) packets or other information between network addresses. The network 101 may include one or more local area networks (LANs); metropolitan area networks (MANs); wide area networks (WANs); a virtual private network (VPN); all or a portion of a global network, such as the Internet; or any other communication system or systems at one or more locations.

The network 101 facilitates communications among various servers 102-104 and various client devices 106-114. Each of the servers 102-104 may be any suitable electronic computing or processing device(s) that can provide computing services including software for one or more client devices 106-114. Each of the servers 102-104 could, for example, include one or more processing devices, one or more memories storing instructions and data, and one or more network interfaces facilitating communication over the network 101. For example, as discussed in greater detail below, server 102 provides an abstracted interface for gamification of machine learning algorithms that are implemented using one or more of the client devices 106-114. Server 103 may be a server assorted with software or gaming development that, as discussed in greater detail below, integrates the abstracted interface to utilize crowd sourcing techniques to improve machine learning algorithms. Server 104 may be a server associated with a researcher, developer, or other grid computing consumer that has problems that need to be solved and/or projects or tasks that need to be processed using the abstracted interface. Additionally, in some embodiments, any of the servers 102-104 may receive, store, and/or analyze metrics for machine learning algorithm performance to evaluate algorithm performance and/or may provide results of machine learning algorithm solutions to researchers as is discussed in greater detail below.

Each client device 106-114 represents any suitable electronic computing or processing device that interacts with at least one server or other computing device(s) over the network 101. In this example, the client devices 106-114 include a desktop computer 106, a mobile telephone or smartphone 108, a tablet computer 110, a laptop computer 112, a video game console 114; a set-top box and/or television, etc. However, any other or additional client devices could be used in the networked system 100. For example, any Internet or network connectable device or Internet of Things (IoT) device (e.g., Smart TVs, refrigerators, Raspberry PIs, etc.) could be used for one of the client devices 106-114 in system 100. As discussed below, in various embodiments, client devices 106-114 participate, under the coordination of server 102, to form a volunteer computing grid (possibly along with other computing devices) to implement the abstracted interface for gamification of machine learning algorithms. For example, as discussed herein, the client devices 106-114 may be run various video games or interactive applications that include the ability to run one or more machine learning algorithms in an abstracted matter. Additionally, in various embodiments, any of the client devices 106-114 may generate, send, and/or analyze metrics for machine learning algorithm performance to evaluate algorithm performance and/or may provide results of machine learning algorithm solutions to researchers as is discussed in greater detail below. In some embodiments, individual client devices 106-1144 can communicate with each other or a server directly or indirectly using, for example, a peer to peer, ad hoc, and/or mesh-based networks with or without a centralized server to implement the abstracted interface. Additional examples, of a platform for a computing grid for collaborative processing of computing tasks are described in U.S. application Ser. No. 16/000,589 filed Jun. 5, 2018 and entitled "Platform for Collaborative Processing of Computing Tasks," which is incorporated by reference herein in its entirety.

Although FIG. 1 illustrates one example of a networked system 100, various changes may be made to FIG. 1. For example, the system 100 could include any number of each component in any suitable arrangement and each of servers 102-104 and client devices 106-114 may be representative of any number of servers and/or client devices that are part of system 100. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
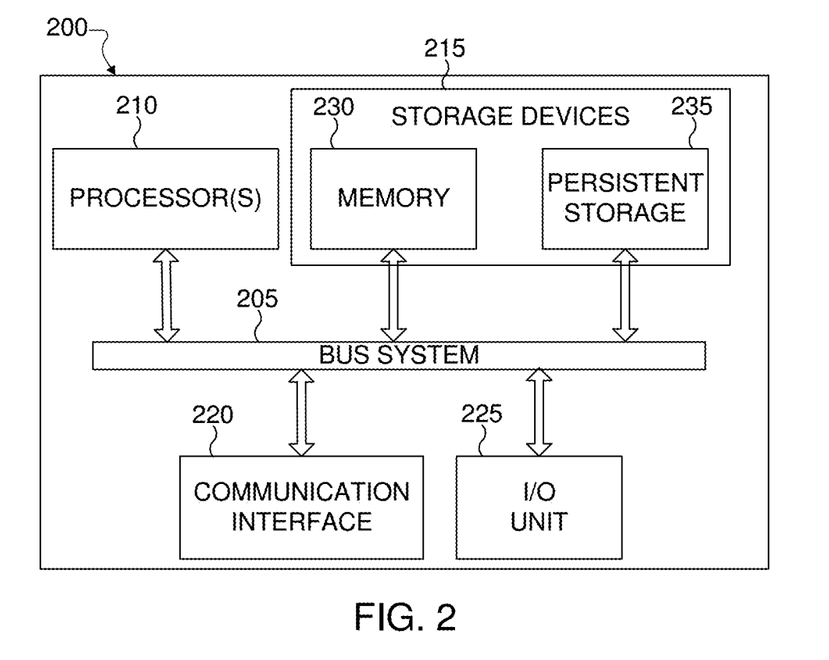
FIG. 2 illustrates an example of a server in which various embodiments of the present disclosure may be implemented.
Figure 3:
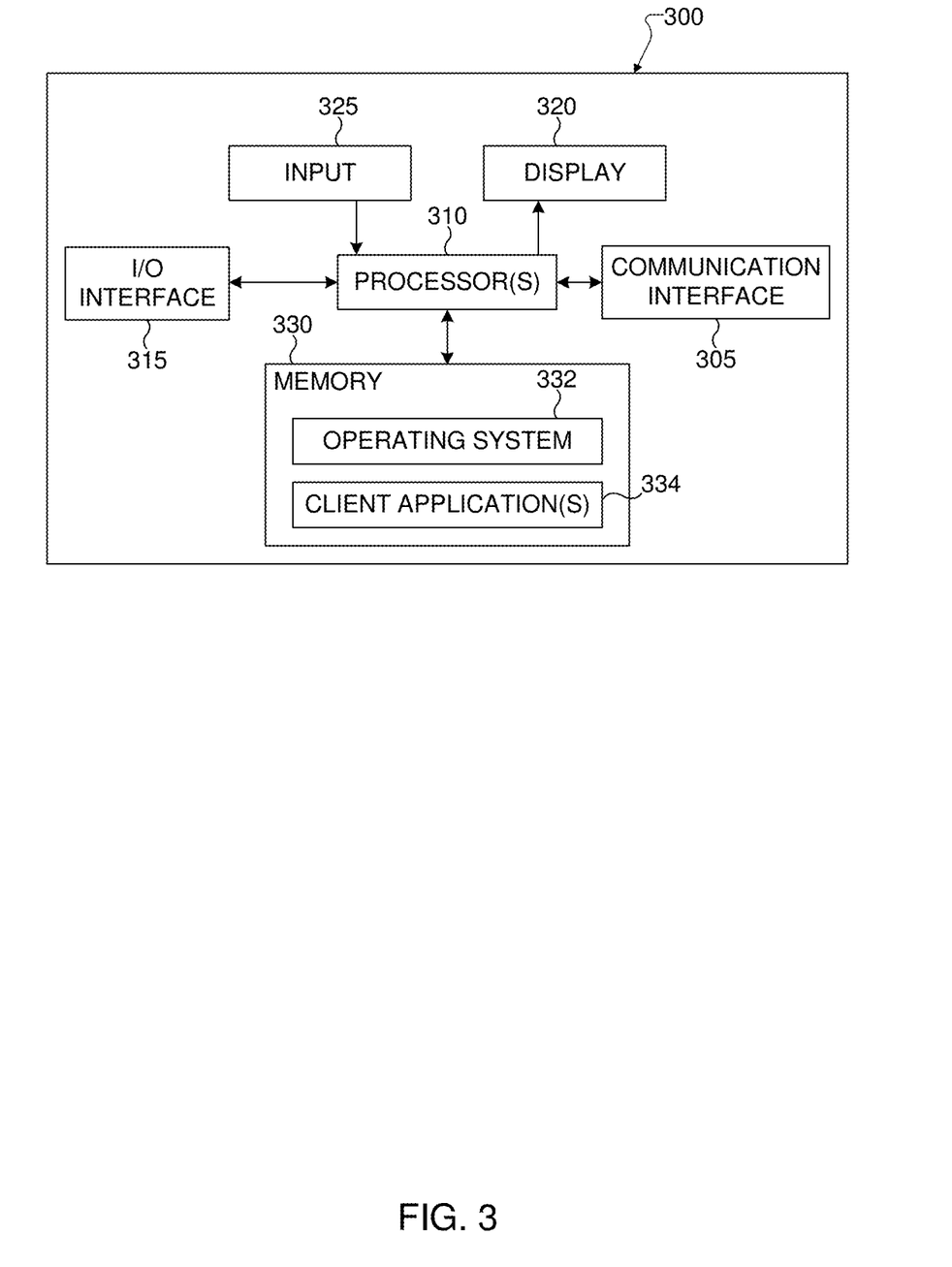
FIG. 3 illustrates an example of a client device in which various embodiments of the present disclosure may be implemented.

FIGS. 2 and 3 illustrate example computing devices in a networked system according to various embodiments of the present disclosure. In particular, FIG. 2 illustrates an example server 200, and FIG. 3 illustrates an example client device 300. In this illustrative example, the server 200 represents any one of the servers 102-104 in FIG. 1, and the client device 300 could represent one or more of the client devices 106-114 in FIG. 1.

As shown in FIG. 2, the server 200 includes a bus system 205, which supports communication between processor(s) 210, storage devices 215, communication interface 220, and input/output (I/O) unit 225. The processor(s) 210 executes instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random-access memory or any other suitable volatile or non-volatile storage device(s). The persistent storage 235 may contain one or more components or devices supporting longer-term storage of data, such as a read-only memory, hard drive, Flash memory, or optical disc. For example, persistent storage 235 may store one or more databases of data, client applications, tasks awaiting dispatch to cells in volunteer computing grid, and/or processing results from a volunteer computing grid, etc. In various embodiments, persistent storage 235 may store the video games with interfaced machine learning algorithms or components of video games for integrating machine learning algorithms in the games for distribution over the network 101.

The communication interface 220 supports communications with other systems or devices. For example, the communication interface 220 could include a network interface card or a wireless transceiver facilitating communications over the network 101. The communication interface 220 may support communications through any suitable physical or wireless communication link(s). The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Although FIG. 2 illustrates one example of a server 200, various changes may be made to FIG. 2. For example, various components in FIG. 2 could be combined, further subdivided, or omitted and additional components could be added according to particular needs. As a particular example, while depicted as one system, the server 200 may include multiple server systems that may be remotely located. In another example, different server systems may provide some or all of the processing, storage, and/or communication resources for providing an abstracted interface for gamification of machine learning algorithms in accordance with various embodiments of the present disclosure.

FIG. 3 illustrates an example client device 300 according to embodiments of the present disclosure. The embodiment of the client device 300 illustrated in FIG. 3 is for illustration only, and the client devices 106-114 of FIG. 1 could have the same or similar configuration. However, client devices come in a wide variety of configurations, and FIG. 3 does not limit the scope of this disclosure to any particular implementation of an electronic device. As shown in FIG. 3, the client device 300 includes a communication interface 305, processor(s) 310, an input/output (I/O) interface 315, an input 325, a display 320, and a memory 330. The memory 330 includes an operating system (OS) 332 and one or more client applications 334.

The communication interface or circuit 305 supports communications with other systems or devices. For example, the communication interface 305 could include a network interface card or a wireless transceiver facilitating communications over the network 101. The communication interface 305 may support communications through any suitable physical or wireless communication link(s). For embodiments utilizing wireless communication, the communication interface 305 may receive an incoming RF signal via one or more antennas using a variety of wireless communication protocols, (e.g., Bluetooth, Wi-Fi, cellular, LTE communication protocols etc.).

The processor(s) 310 can include one or more processors or other processing devices and execute the OS 332 stored in the memory 330 in order to control the overall operation of the client device 300. The processor(s) 310 is also capable of executing client application(s) 334 resident in the memory 330, such as, one or more client applications for processing of tasks and storage as part of a volunteer computing grid. In various embodiments, the processor(s) 310 execute client application(s) 334 resident in the memory 330, such as, one or more video games that include abstracted machine learning algorithms for providing solutions to problems as discussed in greater detail below. The processor(s) 310 may include any suitable number(s) and type(s) of processors or other devices in any suitable arrangement. Example types of processor(s) 310 include microprocessors, microcontrollers, graphical processing units (GPUs), digital signal processors, field programmable gate arrays, application specific integrated circuits, and discrete circuitry.

The processor(s) 310 can move data into or out of the memory 330 as required by an executing process. The processor(s) 310 is also coupled to the I/O interface 315, which provides the client device 300 with the ability to connect to other devices, such as laptop computers and handheld computers. The I/O interface 315 provides a communication path between accessories and the processor(s) 310.

The processor(s) 310 is also coupled to the input 325 and the display 320. The operator of the client device 300 can use the input 325 to enter data and inputs into the client device 300. For example, the input 325 may be a touchscreen, button, keyboard, track ball, mouse, stylus, electronic pen, video game controller, etc. The display 320 may be a liquid crystal display, light emitting diode display, or other display capable of rendering text and/or at least limited graphics, such as from web sites. The memory 330 is coupled to the processor(s) 310. Part of the memory 330 could include a random-access memory (RAM), and another part of the memory 330 could include a Flash memory or other read-only memory (ROM).

Although FIG. 3 illustrates one example of client device 300, various changes may be made to FIG. 3. For example, various components in FIG. 3 could be combined, further subdivided, or omitted and additional components could be added according to particular needs. As a particular example, the processor(s) 310 could be divided into multiple processors, such as one or more central processing units (CPUs) and one or more graphics processing units (GPUs). In another example, the display 320 may be externally connected to or not a part of the client device 300, such as for example, with a video game console or desktop computer.

As discussed herein, various embodiments of the present utilize the components of the system 100 to provide a framework for an interface between video games, machine learning, and solutions to problems. The abstracted interface in accordance with various embodiments connect a machine learning algorithm to run within a game and allows players to interact with that algorithm and in such a way that the algorithm connection is not dependent upon the specific algorithm or technique. For example, the machine learning algorithm is abstracted within the game such that the machine learning algorithm can be replaced with another piece of an algorithm, input via the gaming interface, or an entirely new algorithm (e.g., to solve different scientific problems for different researchers) but will still fit within the same game.

Various embodiments recognize that traditional game developers already know what the solution to their video game is when programming the game. However, with machine learning, various embodiments recognize that the researcher often has no idea what the correct solution is to their problem is or even if the correct solution exists. Accordingly, various embodiments of the present disclosure allow for users to play already popular and/or engaging games, have these games, which have a known end goal how, stay fun, and also solve the problem of integrating a machine learning algorithm, which may not have an end solution or a guarantee of a good solution. Accordingly, various embodiments of the present disclosure provide the abstracted interface for users to play engaging games while keeping the game fun and engaging—with little or no invasiveness by the algorithm Various embodiments of the present disclosure further recognize and take advantage of the understanding that positive results for the solution can occur by only needing to be able to characterize how the algorithm performs. The solutions provided by the integrated machine learning algorithm may still be poor after processing during a game. However, if the algorithm solutions can be characterized, the various embodiments of the present disclosure are able to compare algorithm characterizations to determine if the solution provided by the algorithm is improving. So long as there is at least a small amount improvement, the ability abstracted interface to run within highly popular games greatly multiplies the amount of improvement overall to the machine learning algorithm and the ultimate solution to the problem being researched.

In some embodiments, citizen science or crowd-sourced research is utilized in accordance with one or more aspects of the machine learning algorithm to provide for further improvement to the solutions provided by the machine learning algorithm. For example, by analyzing CS projects, CS games, and game design techniques, embodiments of the present disclosure provide a structure for researchers to break their problem down into a consistent format that can be included within video games. An accompanying application programming interface (API) provides a general interface allowing game developers and the modding community (e.g., developers) to access the CS data and accompanying support functionality. This structure allows developers to apply their design expertise to integrate the CS more naturally into their game, which provides more engagement and expands the user base. The abstracted interface of various embodiments allows scientists to focus on their domain knowledge and expertise, while providing an avenue to leverage the skills of game developers to create new interfaces and engaging integration into gameplay, and both can leverage the added creativity of crowdsourced community solutions for games that support a modding community. Additionally, the integrated solution allows CS researchers to take advantage of CS research after the game and/or interface is released as new data and parameters are being uploaded.

Figure 4:
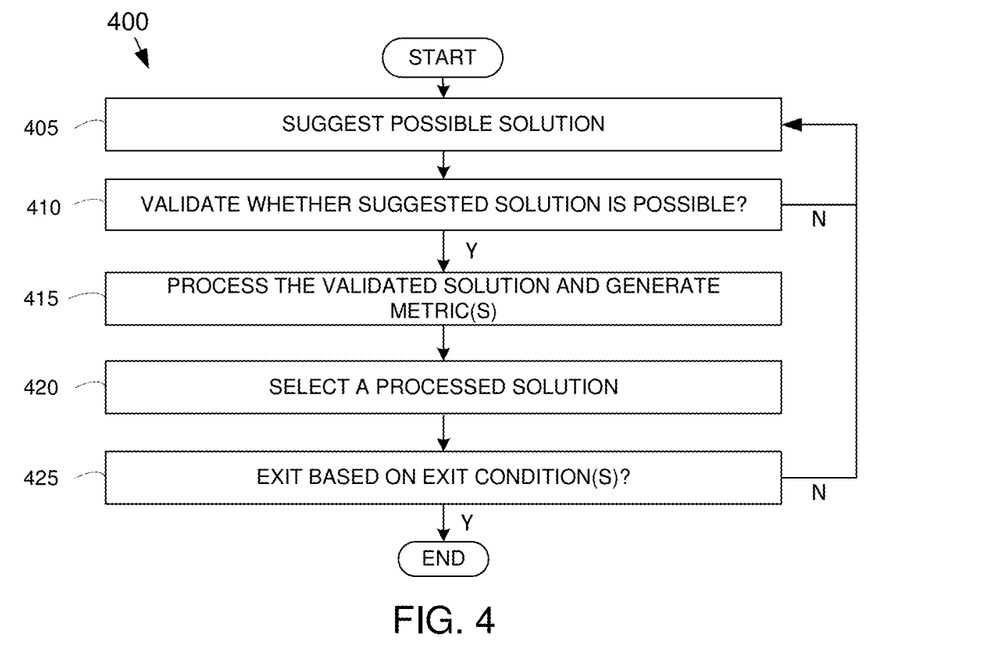
FIG. 4 illustrates a process for implementing an abstracted algorithm interface that allows for gamification of machine learning algorithms in accordance with various embodiments of the present disclosure.

FIG. 4 illustrates a process 400 for implementing an abstracted algorithm interface that allows for gamification of machine learning algorithms in accordance with various embodiments of the present disclosure. For example, the process depicted in FIG. 4 can be implemented by the client device 300 in FIG. 3, the server 200 in FIG. 2, and/or any of the client devices 106-114 in FIG. 1 (collectively or individually referred to as "the system").

As discussed herein, embodiments of the present disclosure break a machine learning algorithm into the below discussed five steps, such that if a problem can follow the same format, solutions for the problem can be processed within video games—thus providing an interface between video games, machine learning, and problems. As depicted, the process 400 is an iterative process with the machine learning algorithm processing multiple suggested solutions in various cycles. The process begins with the system suggesting a possible solution (step 405). For example, in step 405, the system is running a video game. Within the video game, the system is also processing a machine learning algorithm to provide solutions to a scientific problem that has been broken into the format for suitably being processed by the machine learning algorithm within the game. In step 405, the system suggests or generates some potential solution to the problem, whether possible or not. In embodiments incorporating CS, the system may present what are the criteria for a potential solution to the research problem and request input from a user of the potential solution. For example, as discussed in greater detail below, the solution may be suggested by a user or identified by the system based on user input(s). In various embodiments, multiple solutions can be suggested in step 405 and evaluated in each iteration of the process 400.

Thereafter, the system validates whether the suggested solution is possible (step 410). For example, in step 410, the system determines whether the suggested solution could possibly be a valid solution to the problem. For example, if there are limitations to the established measurements, algorithms, or equations that help determine the structure of the output or if the solution is required to be in a specific format (e.g. a Bayesian network needing to be acyclic) the suggested solution may not be possible. If the suggested solution (or all of the solutions suggested in step 405) is (are) not possible or invalid, the system returns to step 405 to suggest other solution(s).

After validating that the suggested solution is possible, the system processes the validated solution and generates metric(s) (step 415). For example, in step 415, the system tests or evaluates the solution by running the machine learning algorithm using the current proposed solution. The processing also includes characterizing the performance of the machine learning algorithm by using one or more metrics to determine how well the algorithm performed. For example, without limitation, these algorithm characterization metrics may include execution time, global/local score, total solutions explored, percent of solutions valid, and trends on the learning curve. These are characterizations of the machine learning algorithm the system uses to see if the algorithm improves. As discussed in greater detail below, the testing or evaluation of the solution may involve modification of the parameter values for the solution, which may be suggested or selected by a user (e.g., identified by the system based on user input(s)) or selected or suggested by the system, and combinations thereof.

As discussed above, regardless of whether the improvement is significant or the solution is an ultimately useful result, so long as the solution can be characterized the machine learning algorithm can run within the game. If there is any improvement, as determined based on comparison of characterization metrics, then the processing of the machine learning algorithm in the game is useful. Any minor improvement will be significantly magnified with the massive scale of video gaming as a result of the abstracted interface of the present disclosure enabling the machine learning algorithm to run within popular and engaging video games.

The execution time is the total time (or other metric of computing resources such as cycles) that the machine learning algorithm used to process the solution. For example, even if the algorithm only provides a modest improvement from cycle to cycle, but the execution time is low, then this algorithm may be preferred over an algorithm that provides a larger improvement in solution from cycle to cycle but has a much greater execution time. The global score characterizes how the current solution ranks relative to all prior solutions processed for the particular scientific problem. For example, solutions processed by the system as well as other client devices in system 100 that are also running the machine learning algorithm for the particular scientific problem being processed. Local score characterizes how the current solution ranks relative to all prior solutions processed by the particular client device 300.

The solutions explored is a metric for how many possible solutions of a total solution space a technique employed by the machine learning algorithm is able to explore. For example, using technique employed by the machine learning algorithm, the solutions explored metric quantifies how many solutions or what percentage of solutions (e.g., such as the number of suggestible solutions in step 405) of a total possible number of solutions in a solution space will the machine learning algorithm explore. For example, utilizing the increase in engagement provided by the present disclosure, a machine learning algorithm that explores a greater percentage of total solutions may be better despite poorer performance elsewhere. Additionally, this metric can be updated over time as additional solutions are suggested in additional iterations of the process.

The percent of solutions valid is a metric for what percentage of the proposed or suggested solutions for the machine learning algorithm are valid, for example, if only two-thirds of the total solutions are valid then the algorithm with more total solutions may be worse than another algorithm that has fewer solutions but a higher percent valid. Additionally, this is a metric that is updated over time as additional solutions are validated in additional iterations of the process. Trends on the learning curve is a metric for how the algorithm performs over time. A learning curve is an illustration of how the algorithm performs over time, for example, using the global or local score metric. An algorithm's performance may start poorly but may ramp up more quickly on the learning curve and may thus be preferred over an algorithm that starts out with a better solution but shows little improvement from cycle to cycle.

As discussed herein, so long as the algorithm for processing solutions to the scientific problem can be characterized, for example, using one or more of the example metrics discussed above, the algorithm's performance can be measured and if this measured performance improves, no matter how little, the algorithm has been successfully abstracted to gameplay in a manner that ultimately is useful to solve a scientific problem.

Thereafter, the system selects a processed solution (step 420). For example, in step 420, the system reviews the results of n number of processed solutions, for example using the metrics generated regarding the processed solutions, to decide or select which solution to use for further testing. For example, often the suggested solution in step 405 is based on a seeded initial state from a previously selected solution from step 420. Thus, step 405 may additionally include the system suggesting or proposing new solutions using the selected solution as a starting point. For example, as part of step 420, the system may select the solution based on criteria for whether a solution is valuable to be further explored, has the highest score (local or global), etc.

Thereafter the system exits process based on exit condition(s) (step 425). For example, in step 425, the system may determine whether the processing of the machine learning algorithm meets one or more exit conditions. If not, the system returns to step 405 and another iteration of process 400. If so, the system stops the processing of the machine learning algorithm. For example, the exit condition(s) may include processing the machine learning algorithm for a certain amount of time, run for certain number of iterations, certain score for any of the metrics, the solutions for the machine learning algorithm do not improve for a certain number of trials or for a certain period of time (e.g., the algorithm has converged), etc.

Additionally, in various embodiments, the present disclosure provides a framework to allow users to interact with machine learning algorithm through video games. By abstracting gameplay to the algorithm and abstracting the algorithm to run within the game, various embodiments of the present disclosure can mix and match elements of machine learning and user interaction to replace or augment one or more steps of the algorithm or augment one or more steps. For example, a user could select possible solutions, evaluate and rank the solutions, and/or select or decide which solution is the best or the solution to be used next.

The present disclosure provides at least four example scenarios for using user interaction to replace or augment one or more steps of the algorithm or augment one or more steps. As a first example, a user can generate training data that is used to evaluate processed solutions. For example, for a machine learning algorithm to identify a face out of a photo, users could select photos of faces to generate training data used to evaluate the algorithm performance. A second example is supervised learning. For example, for a machine learning algorithm for selecting a certain object in a photo, a user could indicate whether the machine learning algorithm performed correctly.

A third example is mutation. When a machine learning algorithm gets stuck in a local search space or "local minimum" where the solutions do not improve much if any over time, the algorithm applies mutation techniques to get out of the local search space by randomly changing parameters and variables. In one or more embodiments, the system may request input for a user to suggest mutations or different solutions to try to move the algorithm out of the local minimum. For example, the client device may evaluate 1000 solutions using machine learning and provide one or more to the user for the user to manipulate parts of the solution to what might be better. The user manipulated solution is then fed back to the machine learning algorithm for the system to continue to process to try to get out of the local search space. Thereby, the system applies a user selected mutation to the machine learning algorithm—not just a mutation generated using a heuristic or machine learning. As one particular example, for a problem of attempting to program a space craft to fly through an asteroid field, each sensor the space craft is considered an input to the machine learning algorithm and each sensor has a weighting value, for example, in the form of a matrix for a neural network. The machine learning algorithm adjusts sensor weighting values to program relative importance (for example, including the type of response and severity of response for the space craft to take based on the various sensor inputs) to among the various sensors. A user selected mutation could provide input on what sensor are more or less important (e.g., relative importance among long- or short-range sensors) weights sensor. Thus, when the algorithm is rerun with the user selected mutation, the solution can be moved out of the local search space or minimum.

A fourth example is the human search heuristic. In addition to the machine learning algorithm processing, data from actual monitor user game play can be recorded and provided to the machine learning algorithm for the algorithm to "learn" or select solutions (or parts thereof) from what was attempted by the user to more quickly train the machine learning algorithm. In other words, the machine learning algorithm can evaluate the accumulated user data and identify decision patterns to try to learn why user decisions are made. For example, the system includes programming for the search heuristic to evaluate user search and optimization of data and then train a neural network to search the data in the same or similar way that the users did to determine if the results are better or lead to better solutions than if the neural network performed the process without examining data generated from user search and optimization.

As a result, embodiments of the present disclosure further provide a mechanism for artificial intelligence (AI) and users to work together in a cooperative environment to solve problems. In addition to the ability for the machine learning algorithm to simply use idle CPU resources to process certain components in the background, embodiments of the present disclosure provide further improvements to the processing of machine learning algorithms by incorporating inputs from user feedback and gameplay to further improve the effectiveness of the machine learning algorithm using the user contribution techniques discussed above. For example, if the user is selecting the solution, the machine learning algorithm may cause the game to display a solution to a user visually for the user to decide if that solution should be used for the next cycle. Thus, embodiments of the present disclosure provide a framework to allow users to interact with machine learning algorithms through video games.

Accordingly, by focusing on improvement rather than identifying an optimum solution and by basing the game interaction portions on the algorithm finding better solutions not necessarily the best solution, embodiments of the present disclosure abstract machine learning algorithms such that machine learning algorithms can be applied to many more games than otherwise applicable. By focusing on improvement and utilizing the abstraction techniques disclosed herein, embodiments of the present disclosure allow for the engagement in the game to remain high, for example, as if no algorithm was being used within the game or with little deviation from normal game play. In this manner, by abstracting elements of the machine learning algorithm, embodiments of the present disclosure enable the inclusion of the machine learning algorithm within components of the game. This enables researchers and developers to have their problems processed through machine learning within much more widely accepted video games of mass appeal using the abstracted interface for machine learning algorithms disclosed herein. Additionally, with the abstracted interface of the present disclosure, any type of machine learning algorithm or techniques can be used (i.e., is not dependent on a specific type of algorithm), for example, the machine learning algorithm could be a genetic algorithm, particle swarm optimization, use neural network techniques, etc.

In various embodiments, the system provides a generic interface that allows game developers to integrate a variety of CS projects as well as the ability to access a distributed volunteer grid computing network. In order for a researcher to take advantage of this resource, the researcher only needs to analyze and break down their projects into a format supported by the interface. The game developers integrate the API into their game, design an engaging system that supports a given problem type, and access to the results data. This system is then reusable to apply to other similar problems once they are converted to the supported format. Fundamentally, any sort of CS project can be analyzed given the project can be broken into the following general analysis structure.

First, the system identifies the problem to be analyzed or solved. When analyzing a project, the first stage is to identify the type of work needed to process the data. For example, is the problem a data generation problem (e.g., the user is creating new data for some purpose)? Is the problem a user analysis problem (e.g., users are classifying or otherwise doing micro-tasks)? Is the problem a user computation problem (e.g., users' players are applying more complex problem-solving skills)? Is the problem a problem that would more traditionally be done using machine learning algorithm or approach, but has a potential interactive element (a hybrid project)?

Second, the system captures and transforms the data. For example, the system determines what format is the data in; whether the data be broken it into smaller, more manageable micro-chunks of data to make the data more accessible; and determines whether the data is uniform or is there something unique about some of the data. For example, the system may determine that is some of the data is already processed and could serve as a foundational sample (e.g., either as training data or the foundation for a game tutorial). The data may need to be something that can be placed in a parse-able format such as a classic comma separated value (CSV) file or use a CSV file to create an index to image data.

Third, the system identifies supporting heuristics, simulation research, or fitness criteria. For example, the system determines whether there any established heuristics that have proven successful in past analyses of this or similar research. These heuristics can provide guidelines for the development community to help understand the process and may inform some of the design choices relating to the gameplay loops, where developers can create activities that mimic some of the heuristic approaches. Developers can also map normalized heuristic output to various gameplay elements (e.g. object color, statistic multipliers), providing unique ways for users to visualize and interact with the problem/data. Similarly, the system determines whether there are established equations, algorithms, tools, or other equations that can make the simulation more accurate.

Examples of this type of information include the Rosetta structure prediction methodology. In situations where user computation is a factor, this sort of information can be useful for making the data have value. These simulations tools may also be used for validation, either in the validate or the select steps, and may also be useful in creating a fitness score or metrics as part of the process step. Group scoring or consensus can also serve as verification tools using statistical analysis techniques to provide numeric guidance. In order for the process step to provide feedback to the user or get a relative sense of the quality of user work, there is some sort of fitness function that outputs a value or metric representing the relative quality of given user-generated results. This fitness function can come from the type of problem being solved (e.g., a clustering problem) or something specific to the area of research. To work well in a game, these fitness functions need to be fast and efficient as frame rate and consistent; real-time feedback can be important to successful engagement.

There are a number of elements to consider in order to easily integrate the scientific research into the gameplay and aesthetic/theme. Below described are a few principles for integration of games to provide a balance between the gameplay and scientific research value. First, games are designed for broader application. If the problem can be abstracted such that other problems of the same type can also be addressed (e.g., any problems using clustering algorithms can use the same games/mechanics), opportunities are provided for a mix of data to add variety to the gameplay. Unless scientific understanding is fundamental to the success of the output, game design elements are designed to achieve the desired result without specifically referring to the science.

Second, the game integration identifies and reinforces the desired output. The fitness function or other measures of success factor into the feedback given to the player in order reinforce the research value of the output. While the fitness function provides a numeric value, feedback is also modified to be consistent with the game's aesthetic and theme. The output is compared with the stated measures of success, as sometimes the best result varies with research needs. Other desired behaviors such as accuracy (quality), overall contribution (quantity), and efficiency (speed) are factored them into the game rewards and/or feedback. Formulas for success do not all necessary relate to the output but are balanced such that the most important factors have sufficient weight. Inappropriate weighting could result in reinforcing undesired behavior or users "gaming" the system, both of which reduce the quality of the results.

Third, the research activity is integrated into the game loops. Since the gameplay loops represent the central activities motivating players, seamless integration is facilitated by connecting the research activity to the loops. Both the player actions and the resulting output are factors in integrating the activity. The research activity is broken into the component actions used to complete the output. These actions often suggest a particular gameplay element, mechanic, or system. Comparing the form of the output coming from the research activity to the desired result can suggest integration technique, for example, any existing game mechanics that mimic the scientific activity. Integrating the mechanic into the gameplay allows the scientific elements integrate more naturally. Similarly, leveraging a game mechanic proven in other games can help reduce the number of variables requiring balance, and put more focus on integration rather than on making the mechanic itself engaging.

Fourth, the game is design for unusual results. Unlike game systems that can be catered to the needs of the game, research output can sometimes provide extreme and unexpected results. Depending on the data, it is possible to have a player experience complete success, failure, or never achieve either. As such, the games need to maintain engagement for these results, which are factored into game feedback or other gameplay elements.

Fifth, the games balance the complexity and accuracy. Players can balance a number of elements, but there is a point where the gameplay complexity, human computing complexity, and expected speed and accuracy may create challenges that extend beyond the average player's cognitive threshold. To balance this, increasing the complexity in one element may be balanced by reduced complexity in other elements. If the problem has high accuracy needs or requires complex human calculation, a fast-paced, real-time, high skill game is less likely to produce the desired results with a majority of players. A slow-paced or turn-based mechanic allows the player to take their time and consider the problem, which may fit the needs better. As a result, simpler problems can typically sustain more complex mechanics and timing should they fit the desired gameplay better.

Sixth, game integration considers the integration of the game's aesthetic and/or theme. Research activities that involve non-visual data often work with any theme. Those involving visual data, such as elements found in classification type problems, may require some creative consideration to make the elements fit within the overall game.

For the purposes of illustrating advantages of the embodiments of the present disclosure, the following example implementation regarding medication research is discussed. This implementation is intended as an illustrative example and not a limitation on the various embodiments that can be implemented in accordance with the principles and teachings of the present disclosure. In looking for chemotherapeutic co-medication properties for multidrug resistant cancer, the problem identified for solving was one of volume. A co-medication is a drug that helps make existing drug resistant cancer cells more effective. Co-medication research is relatively new, so there is little data allowing researchers to identify good candidates from existing drugs. Even with some eliminations/reductions, over 5 million potential co-medications need to be evaluated in some way. In early research, scientists purchased 71 medications and tested them as potential co-medications, with 23 showing some success and the remaining 48 not. Each drug has 30 identifying variables. In the simplest situation, the researchers wanted a way to determine commonalities in the 23 successful drugs to help create a system to identify new drugs for testing and conversely what aspects in the remaining drugs made them unsuccessful.

Following the CS model, the first questions focused on identifying the problem. After examining the problem, the data set, and the desired information, looking for commonalities between the groups presented as a clustering problem. After determining the problem parameters, the data was analyzed to determine how to present the information. Each drug already existed in a table that documented the 30 variables. In order to use the data in the clustering problem, the data was normalized so that it could all be represented on a consistent scale, in this case 0-1. A data point noting each drug's relative success or failure as a co-medication was added and the data was converted that data to a CSV file.

When looking for heuristics, simulation research, and fitness criteria, the needs of a clustering problem were identified. There are many clustering algorithms that could form the base algorithm. In this case, a centroid-based algorithm was selected, such as the K-means, as a starting point. Fundamentally, a centroid-based algorithm moves the centroid looking for the best score, providing a heuristic to start from. The centroid movement also suggested an area of interactivity for players to interface with, functionally replacing that aspect of the algorithm.

The other driving factor in a clustering algorithm is determining a fitness score guides the movement of the centroids and helps identify if it is moving towards or away from an improved score. This function is also critical for players to be able to evaluate their success. In this situation, the goal was trying to see what separated the two groups, so that became the basis for the fitness score, a weighted average showing the how many of the working co-medications were in one group verses how many were in the other. While two centroids were started with because there are two fundamental groups, the fitness score was designed such that any number of centroids could be added in future iterations.

Analyzing any accuracy guidelines, users needed accurate enough data that users could tell if they are improving the score, but precision was not as critical, as the expectation was that the data provided by players would provide training data for a separate neural net designed to analyze and identify other potential co-medications outside of the training set. If more refinement proved necessary, the researchers planned to run a separate traditional centroid-based algorithm on the player results to refine the scores.

In implementing the problem, data, and fitness score in game development, in order for the game developers to be able to create interfaces, the key information for game development to know was understanding how clustering algorithms worked and what was attempted to be accomplished with the data set. Finally, the analysis structure questions were analyzed to check whether the data necessary for design an interface to the game was identified. In order to suggest new solutions, users or an algorithm need to be able to provide new centroid positions. To provide a valid solution in our parameters, the centroid positions needed to be within the normalized space determined when we formatted the data. The processing stage in this situation was to apply the fitness function and get a relative score representing how well the groups are separated. In the application of the player-generated data as training information for a neural network, any resulting solution was valid, so there was no filtering necessary at that stage. If additional refinement proved necessary, a separate K-means algorithm was run on the resulting centroids. Finally, the exit parameters were defined as open.

Two examples of gamification of the above-discussed algorithm are provided. The first example represented players manipulating a radio dial to affect the centroid positions, and the resulting score shifts the waveform closer to or farther from matching the targets wave. The second is a medical mini-game where the data positions represented parts of the body and players could adjust the centroid positions to improve various functions. Either or both of these mini-games can be integrated into various aspects of any number of popular and engaging video games.

Various embodiments provide for constructivist-augmented machine learning. Constructivist learning generally refers to a scenario where instructors are able to bring past knowledge into a collaborative partnership with a student to guide their experiential learning process. In these embodiments, the system introduces user knowledge directly into the network, which mimics the instructor-student collaborative relationship seen in constructivist learning theory. As discussed herein, these embodiments of the present disclosure augment the machine learning by receiving inputs generated by the user. For example, in each of the examples discussed above, the machine learning algorithm is augmented based on the interaction, whether it be for mutation, training data, search heuristic, supervised learning, etc. For example, in some embodiments, the system uses clustering technique on the convolution kernels to reduce the problem space and to identify key convolution kernels. The system then replaces kernels with kernels constructed by users. For example, the system allows algorithm guidance by augmenting inputs as well as directly modifying hidden layers, weight and connections throughout the training process. The system also utilizes user identified patterns and optimization opportunities during training and can subsequently modify the machine learning model to take advantage of the user intuition. In these embodiments, the system can improve model accuracy, compress model size, or allow model improvement in absence of large data sets.

In one example of constructivist-augmented machine learning, the machine learning is augmented by using human identified patterns to accelerate the machine learning. For example, by receiving numerous sets of user game inputs for proposed solution (e.g., for object identification in an image), the system can average the game inputs to calculate a probability distribution. Then the system can narrow the search space for the machine learning algorithm. In this manner, the system uses the user inputs as an alpha filter to be applied as one of the many filters applied by the machine learning algorithm in processing the problem to identify the solution.

In another example of constructivist-augmented machine learning, user inputs during a game or other interactive application can be tracked and modeled. The system can use model of the user inputs to modify values of the machine learning algorithm based on performance.

In another example of constructivist-augmented machine learning, user inputs can be used for compression of the machine learning algorithm. For example, the system may use clustering to find average filters for compression. However, such compression may over represent some solutions that are assumed to be different, e.g., due to noise present in the solution, while underrepresenting discrete solutions in the compressed dataset. Using the abstracted interface of these embodiments of the present disclosure, the system can send the clusters (e.g., in an interactive environment) for classification and compression by users. For example, users may be better at recognizing (and ignoring) noise (e.g., in images) to correlate similar solutions that, because of the noise, the machine learning algorithm may not associate. On the other side, the users may not have the basis for the need to achieve compression present in the machine learning algorithm in associating solutions that are not sufficiently similar. In these embodiments, the system can use the user compression inputs in conjunction with the machine learning inputs, weight the respective inputs based on what the associated classifier is better at, and use either or both of the inputs to compress or reduce the size of the data set to assist with speeding further computation and reducing storage requirements.

In another example of constructivist-augmented machine learning, user inputs can be used to improve or modify the machine learning model itself where improvement of the machine learning model is considered the given problem. For example, the machine learning model may perform a clustering algorithm on convolutions to determine average centroids. These centroids may be presented to a user, for example, in an interactive application, for example, as an image or set of images, for the user to select or suggest the solution to improving the machine learning model. The user selected or suggested solution may be in the form of parameters or one or more of the determined centroid to modify or update the machine learning model. Thereafter, system may run the machine learning algorithm based on the modified or updated model (e.g., in multiple iterations) and evaluate the model's performance to determine whether improvement occurred. Later iterations can include the system receiving additional suggestions of solutions for improvement of the machine learning model after iteration on the earlier user solutions suggestions. In this manner, using user suggested solutions to improve the machine learning model may allow for the reduction in the amount of data needed or used to sufficiently train a neural network. Additionally, using user suggested solutions to improve the machine learning model may allow for a reduction in the amount of time for computation or training of the neural network because of the user suggested modifications.

Figure 5:
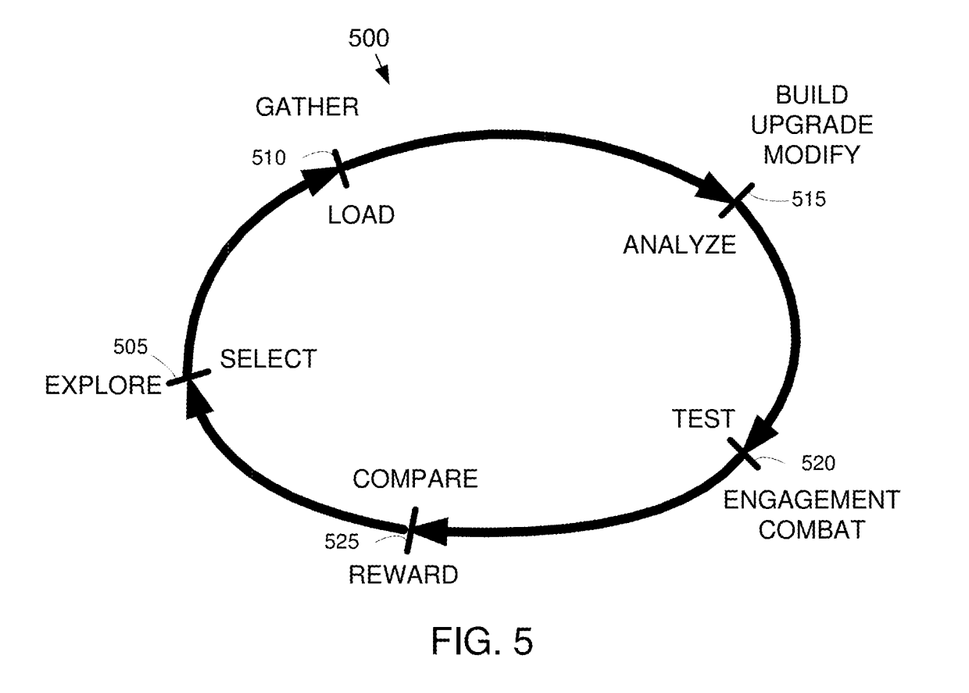
FIG. 5 illustrates an example implementation of a machine learning algorithm within a model of a gameplay loop in accordance with various embodiments of the present disclosure.

FIG. 5 illustrates an example implementation of a machine learning algorithm within a model of a gameplay loop 500 in accordance with various embodiments of the present disclosure. For example, the gameplay loop 500 depicted in FIG. 5 can be implemented within a game run by the client device 300 in FIG. 3 or any of the client devices 106-114 in FIG. 1 (collectively or individually referred to as "the system"). The illustration of the gameplay loop 500 is intended as an example and not a limitation on the various embodiments that can be implemented in accordance with the present disclosure.

The gameplay loop 500 is a model or representation of common activities that can occur during game play that are also relevant or usable to incorporate the machine learning algorithm. For example, during the load (gather) section 510 the system may get the data set and the problem loaded while in the game the user is gathering resources. During the analyze section 515 (build, upgrade, modify section of the gameplay loop 500) the system is performing the processing or evaluating of the solutions while in the game the user is building, upgrading, and/or modifying. For example, portions of the process 400 can be a sub-loop within the analyze section 515 where new solutions are proposed, validated and processed. In one example, the analyze section 515 may involve modifying the suggested or determined solutions, for example, with regard to the constructivist-augmented machine learning as discussed above. As such the system may utilize modifying kernels of a deep learning network for the machine learning model that are modified by user interaction. Clustering can provide possible solutions. Then, the system can use the user interaction to modify the clusters and then move forward modifying the machine learning model.

Then once a processed solution is processed, the system tests (test section 520) that solution to determine how good the selected solution was, then compares (compare section 525) that solution with previous solution(s) to determine if the solution was better than previous solutions and, thereafter, selects that solution (select section 505) to begin the loop 500 again. As part of the test section 520, the system may generate metrics while in the game the user is performing engagement or combat. As part of the compare section 525, the system can also incentivize user participation and/or improved results with in-game rewards including, for example, continued gameplay, virtual items, rankings, etc.

Figure 6:
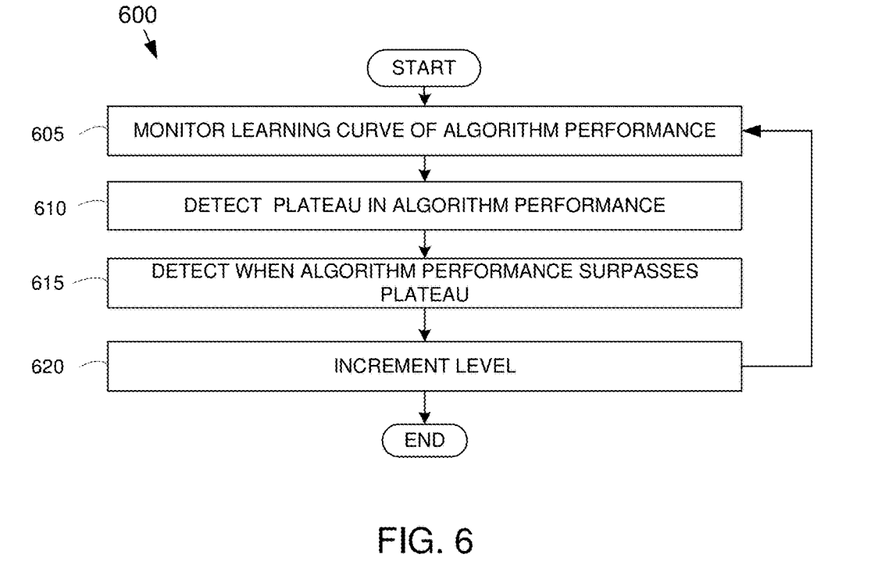
FIG. 6 illustrates a process for using algorithm performance to dynamically scale gameplay and adjust game level in accordance with various embodiments of the present disclosure.

FIG. 6 illustrates a process for using algorithm performance to dynamically scale gameplay and adjust game level in accordance with various embodiments of the present disclosure. For example, the process depicted in FIG. 6 can be implemented by the client device 300 in FIG. 3, the server 200 in FIG. 2, and/or any of the client devices 106-114 in FIG. 1 (collectively or individually referred to as "the system").

In these embodiments, the system monitors and uses the learning curve for algorithm performance (step 605) to adjust game level and dynamically scale gameplay. For example, in step 605, the system may plot a performance metric, such as global score, over time to generate and monitor the algorithm learning curve. An example of scoring metrics for algorithm performance or learning curve for the algorithm is shown by way of illustration in FIG. 7. As shown, large ramp in algorithm performance occurs initially at 705 and then the algorithm performance goes flat after a while at plateau 710. For the periods of ramp up, that is typically the beginning of a level. As soon as the score plateaus, the game has reached the end of a level. The system detects the occurrence of this plateau (step 610). For example, in step 610, the system may use one or more thresholds or average of sequential scores as parameters to determine when algorithm performance has plateaued relative to earlier ramp up. This plateau may be considered a local minimum.

Figure 7:
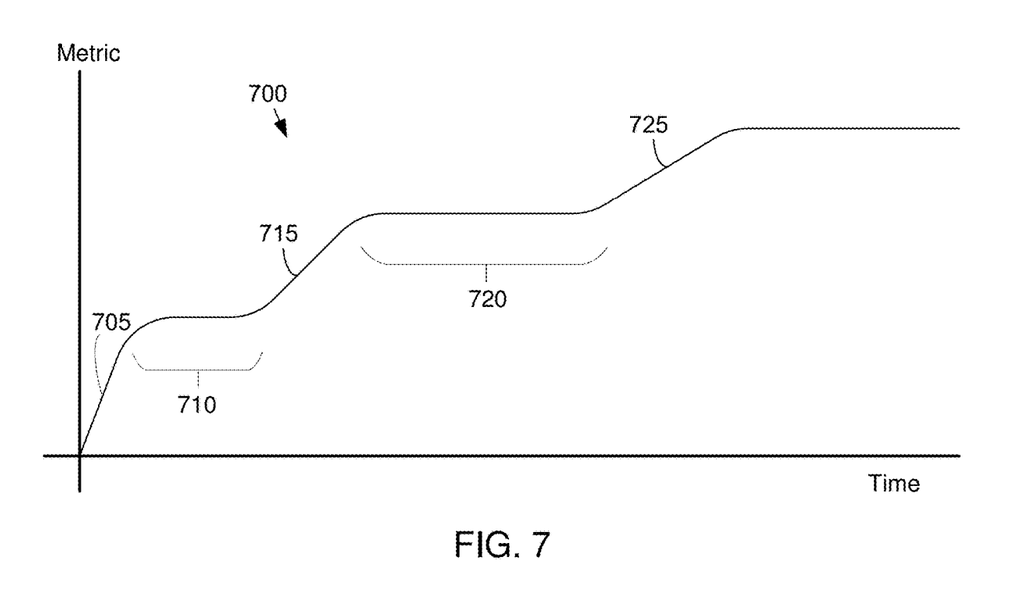
FIG. 7 illustrates an example graph of machine learning algorithm performance over time used to dynamically scale gameplay and adjust game level in accordance with one or more embodiments of the present disclosure.

The system then monitors for when algorithm performance surpasses the plateau (step 615). For example, in step 615, the system is looking for the user to mutate out of the local minimum for the plateau 710 and finds a better solution causing algorithm performance to increase again at 715 with the learning processing starting again. As part of step 615, the system may use one or more thresholds that can be relative to score variations within plateau 710 in determining that the algorithm performance has surpassed plateau 710. Upon detecting algorithm performance surpassing the plateau, the system increments the game level (step 620), with the process repeating for each level of the game. For example, the increase algorithm performance after a plateau is considered level two (or the next level) of the game.

At the change in level, the gameplay character is increased in ability as an incentive for breaking out of a previous local minimum and improving algorithm performance. Each level is more difficult to get to, which means that additional computing time and/or algorithm interaction is needed to reach a next plateau 720 and break out at 725. For example, the user is incentivized to leave the computer running longer to donate additional resources (e.g., in the game, performing gathering steps) to get to the next level and additional incentives.

In these embodiments, game difficulty is scaled upon the level of the character, not necessarily on the performance of the algorithm. The difficulty of the game is scaled based on the character ability which is based on levels reached as a result of monitoring the learning curve. For example, in a first-person shooter (FPS) game, the difficulty may be the number of enemies on a level. That number can be increased based on character abilities to keep the gameplay challenging and engaging. How strong the character is, or the character's abilities are dependent on the number of levels achieved which is tied to the learning curve. In this manner, gameplay mirrors algorithm performance and the user is provided with incentives and engagement to further improve the algorithm performance.

Although FIGS. 4 and 6 illustrate examples of processes for implementing an abstracted algorithm interface that allows for gamification of machine learning algorithms and using the algorithm to dynamically scale gameplay and adjust game level, respectively, various changes could be made to FIGS. 4 and 6. For example, while shown as a series of steps, various steps in each figure could overlap, occur in parallel, occur in a different order, or occur multiple times. In another example, steps may be omitted or replaced by other steps.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Although the present disclosure has been described with an exemplary embodiment, various changes and modifications may be suggested to one skilled in the art. It is intended that the present disclosure encompasses such changes and modifications as fall within the scope of the appended claims.

One embodiment provides a method for interactive machine learning. The method includes iteratively performing a process including steps of identifying a solution to a given problem; processing, based on determining that the identified solution is a possible solution to the given problem, the possible solution by running a machine learning application using the possible solution; selecting a processed solution based on a plurality of processed solutions at least a portion of which are from different iterations of the process; and determining whether to exit the process with the selected solution for the given problem based on an exit condition. Performing the process includes receiving, via a user interface for an interactive application, inputs into the interactive application to use in performing at least part of one of the steps.

Another embodiment provides a system for interactive machine learning. The system includes a processor and a communication interface operably connected to the processor. The processor is configured to iteratively perform a process including steps of identifying a solution to a given problem; processing, based on determining that the identified solution is a possible solution to the given problem, the possible solution by running a machine learning application using the possible solution; selecting a processed solution based on a plurality of processed solutions at least a portion of which are from different iterations of the process; and determining whether to exit the process with the selected solution for the given problem based on an exit condition. The communication interface is configured to receive, via a user interface for an interactive application, inputs into the interactive application to use in performance of at least part of one of the steps.

Another embodiment provides a non-transitory, computer-readable medium for interactive machine learning. The computer-readable medium includes program code that, when executed by a processor of a system, causes the system to iteratively perform a process including steps of identifying a solution to a given problem; processing, based on determining that the identified solution is a possible solution to the given problem, the possible solution by running a machine learning application using the possible solution; selecting a processed solution based on a plurality of processed solutions at least a portion of which are from different iterations of the process; and determining whether to exit the process with the selected solution for the given problem based on an exit condition. The computer-readable medium further includes program code that, when executed by the processor of a system, causes the system to receive, via a user interface for an interactive application, inputs into the interactive application to use in performance of at least part of one of the steps.

In any of the above examples and embodiments, the process further includes the steps of generating metrics on the processed solution processed in each iteration; and characterizing performance of the machine learning application using the processed solution based on one or more of the generated metrics. Also, selecting the processed solution comprises selecting the processed solution from the plurality of processed solutions based on the performance of the machine learning application using the selected solution.

In any of the above examples and embodiments, the process further includes receiving the inputs to use in performing at least part of one of the steps comprises identifying, based on the received inputs, modifications to parameters of the machine learning application; identifying the solution to the given problem comprises identifying, for an iteration of the process, the parameter modifications as at least part of the identified solution; and processing the possible solution comprises modifying the machine learning application based on the parameter modifications, and running, in one or more iterations, the modified machine learning application.

In any of the above examples and embodiments, the parameter modifications are identified based on the received inputs are selected from a set of parameter modifications generated by the machine learning application in a prior iteration of the process, the prior iteration prior in time to the iteration.

In any of the above examples and embodiments, receiving the inputs to use in performing at least part of one of the steps comprises receiving, via the user interface, the inputs as parameter inputs for an interaction presented during the interactive application; identifying the solution to the given problem comprises identifying the parameter inputs as at least part of the identified solution; and processing the possible solution by running the machine learning application using the possible solution comprises using the parameter inputs from the interaction presented during the interactive application as at least a modification of parameters for the machine learning application.

In any of the above examples and embodiments, receiving the inputs to use in performing at least part of one of the steps comprises receiving, via the user interface, the inputs as an attempted solution for at least part of the given problem for an interaction presented during the interactive application, wherein a plurality of attempted solutions are received over a plurality of iterations of the process; and selecting the processed solution comprises evaluating the plurality of attempted solutions; and selecting the processed solution based on the evaluation of the attempted solutions.

In any of the above examples and embodiments, receiving the inputs to use in performing at least part of one of the steps comprises receiving, via the user interface, the inputs as indications of whether outputs from running the machine learning application using the possible solution are correct; and processing the possible solution comprises evaluating the possible solution based on the received indications.

In any of the above examples and embodiments, the interactive application is a video game, and the received inputs used in performance of at least part of one of the steps are received from game play of the video game.

None of the description in this application should be read as implying that any particular element, step, or function is an essential element that must be included in the claim scope. The scope of patented subject matter is defined only by the claims. Moreover, none of the claims are intended to invoke 35 U.S.C. § 112(f) unless the exact words "means for" are followed by a participle.

What is claimed is:

1. A method for interactive machine learning, the method comprising:
   iteratively performing a process including steps of:
      identifying a possible solution to a given problem;
      determining whether the possible solution is a valid solution to the given problem;
      after validating the possible solution, processing, based on determining that the identified possible solution is the valid solution to the given problem, the possible solution by running a machine learning application using the possible solution for evaluating the possible solution;
      selecting a processed solution based on a plurality of processed solutions at least a portion of which are from different iterations of the process; and
      determining whether to exit the process with the selected solution for the given problem based on an exit condition,
   wherein performing the process comprises receiving, via a user interface for an interactive application, inputs into the interactive application to use in performing at least part of one of the steps and identifying, based on the received inputs, modifications to parameters of the machine learning application, and
   wherein identifying the possible solution to the given problem comprises:
      identifying that the given problem is associated with improving the machine learning application,
      receiving the inputs in a form of the parameters, and
      identifying, for an iteration of the process, the parameter modifications as at least part of the identified possible solution, and
   wherein processing the possible solution comprises modifying the machine learning application based on the parameter modifications, and running, in one or more iterations, the modified machine learning application.

2. The method of claim 1, wherein the process further includes the steps of:
   generating characterization metrics on the processed solution processed in each iteration, wherein the characterization metrics include execution time, global/local score, total solutions explored, percent of solutions explored, or trends on a learning curve; and
   characterizing performance of the machine learning application using the processed solution based on one or more of the generated characterization metrics,
   wherein selecting the processed solution comprises selecting the processed solution from the plurality of processed solutions based on the performance of the machine learning application using the selected solution.

3. The method of claim 1, wherein the parameter modifications identified based on the received inputs are selected from a set of parameter modifications generated by the machine learning application in a prior iteration of the process, the prior iteration prior in time to the iteration.

4. The method of claim 1, wherein:
   receiving the inputs to use in performing at least part of one of the steps comprises:
      receiving, via the user interface, the inputs as parameter inputs for an interaction presented during the interactive application,
   identifying the possible solution to the given problem comprises:
      identifying the parameter inputs as at least part of the identified possible solution, and
   processing the possible solution by running the machine learning application using the possible solution comprises:
      using the parameter inputs from the interaction presented during the interactive application as at least a modification of parameters for the machine learning application.

5. The method of claim 1, wherein:
   receiving the inputs to use in performing at least part of one of the steps comprises:
      receiving, via the user interface, the inputs as an attempted solution for at least part of the given problem for an interaction presented during the interactive application, wherein a plurality of attempted solutions are received over a plurality of iterations of the process, and
   selecting the processed solution comprises:
      evaluating the plurality of attempted solutions; and selecting the processed solution based on the evaluation of the attempted solutions.

6. The method of claim 1, wherein:
receiving the inputs to use in performing at least part of one of the steps comprises:
receiving, via the user interface, the inputs as indications of whether outputs from running the machine learning application using the possible solution are correct, and
processing the possible solution comprises:
evaluating the possible solution based on the received indications.

7. A system for interactive machine learning, the system comprising:
a processor configured to iteratively perform a process including steps of:
identifying a possible solution to a given problem;
determining whether the possible solution is a valid solution to the given problem;
after validating the possible solution, processing, based on determining that the identified possible solution the valid solution to the given problem, the possible solution by running a machine learning application using the possible solution for evaluating the possible solution;
selecting a processed solution based on a plurality of processed solutions at least a portion of which are from different iterations of the process; and
determining whether to exit the process with the selected solution for the given problem based on an exit condition; and
a communication interface operably connected to the processor, the communication interface configured to receive, via a user interface for an interactive application, inputs into the interactive application to use in performance of at least part of one of the steps; and
wherein the processor is further configured to identify, based on the received inputs, modifications to parameters of the machine learning application,
wherein to identify the possible solution to the given problem, the processor is configured to:
identify that the given problem is improving the machine learning application,
receive the inputs in a form of the parameters, and
identify, for an iteration of the process, the parameter modifications as at least part of the identified possible solution, and
wherein to process the possible solution, the processor is configured to modify the machine learning application based on the parameter modifications, and run, in one or more iterations, the modified machine learning application.

8. The system of claim 7, wherein the processor is further configured to perform the process further including the steps of:
generating characterization metrics on the processed solution processed in each iteration, wherein the characterization metrics include execution time, global/local score, total solutions explored, percent of solutions explored, or trends on a learning curve; and
characterizing performance of the machine learning application using the processed solution based on one or more of the generated characterization metrics,
wherein to select the processed solution, the processor is configured to select the processed solution from the plurality of processed solutions based on the performance of the machine learning application using the selected solution.

9. The system of claim 8, wherein the parameter modifications identified based on the received inputs are selected from a set of parameter modifications generated by the machine learning application in a prior iteration of the process, the prior iteration prior in time to the iteration.

10. The system of claim 7, wherein:
to receive the inputs to use in performance of at least part of one of the steps, the communication interface is further configured to:
receive, via the user interface, the inputs as parameter inputs for an interaction presented during the interactive application,
to identify the possible solution to the given problem, the processor is further configured to:
identify the parameter inputs as at least part of the identified possible solution, and
to process the possible solution by running the machine learning application using the possible solution, the processor is further configured to:
use the parameter inputs from the interaction presented during the interactive application as at least a modification of parameters for the machine learning application.

11. The system of claim 7, wherein:
to receive the inputs to use in performance of at least part of one of the steps, the communication interface is further configured to:
receive, via the user interface, the inputs as an attempted solution for at least part of the given problem for an interaction presented during the interactive application, wherein a plurality of attempted solutions are received over a plurality of iterations of the process, and
to select the processed solution, the processor is further configured to:
evaluate the plurality of attempted solutions; and
select the processed solution based on the evaluation of the attempted solutions.

12. The system of claim 7, wherein:
to receive the inputs to use in performance of at least part of one of the steps, the communication interface is further configured to:
receive, via the user interface, the inputs as indications of whether outputs from running the machine learning application using the possible solution are correct, and
wherein to process the possible solution, the processor is further configured to:
evaluate the possible solution based on the received indications.

13. A non-transitory, computer-readable medium for interactive machine learning, comprising program code that, when executed by a processor of a system, causes the system to:
iteratively perform a process including steps of:
identifying a possible solution to a given problem;
determining whether the possible solution is a valid solution to the given problem;
after validating the possible solution, processing, based on determining that the identified possible solution is the valid solution to the given problem, the possible solution by running the machine learning application using the possible solution for evaluating the possible solution;
selecting a processed solution based on a plurality of processed solutions at least a portion of which are from different iterations of the process; and determining whether to exit the process with the selected solution for the given problem based on an exit condition; and receive, via a user interface for an interactive application, inputs into the interactive application to use in performance of at least part of one of the steps; and wherein the program code, when executed by the processor of the system, further causes the system to identify, based on the received inputs, modifications to parameters of the machine learning application, wherein the program code to identify the possible solution to the given problem comprises program code that, when executed by the processor of the system, causes the system to:
- identify that the given problem is improving the machine learning application,
- receive the inputs in a form of the parameters, and
- identify, for an iteration of the process, the parameter modifications as at least part of the identified possible solution, and wherein the program code to process the possible solution comprises program code that, when executed by the processor of the system, causes the system to modify the machine learning application based on the parameter modifications, and run, in one or more iterations, the modified machine learning application.

14. The computer-readable medium of claim 13, further comprising program code that, when executed by the processor of the system, causes the system to perform the process further including the steps of:
- generating characterization metrics on the processed solution processed in each iteration, wherein the characterization metrics include execution time, global/local score, total solutions explored, percent of solutions explored, or trends on a learning curve; and
- characterizing performance of the machine learning application using the processed solution based on one or more of the generated characterization metrics,
- wherein the program code for selecting the processed solution comprises program code that, when executed by the processor of the system, causes the system to:
  - select the processed solution from the plurality of processed solutions based on the performance of the machine learning application using the selected solution.

15. The computer-readable medium of claim 13, wherein the parameter modifications identified based on the received inputs are selected from a set of parameter modifications generated by the machine learning application in a prior iteration of the process, the prior iteration prior in time to the iteration.

16. The computer-readable medium of claim 13, wherein:
the program code to receive the inputs to use in performance of at least part of one of the steps comprises program code that, when executed by the processor of the system, causes the system to:
- receive, via the user interface, the inputs as parameter inputs for an interaction presented during the interactive application, the program code to identify the possible solution to the given problem comprises program code that, when executed by the processor of the system, causes the system to:
- identify the parameter inputs as at least part of the identified possible solution, and the program code to process the possible solution by running the machine learning application using the possible solution comprises program code that, when executed by the processor of the system, causes the system to:
- use the parameter inputs from the interaction presented during the interactive application as at least a modification of parameters for the machine learning application.

17. The computer-readable medium of claim 13, wherein:
the program code to receive the inputs to use in performance of at least part of one of the steps comprises program code that, when executed by the processor of the system, causes the system to:
- receive, via the user interface, the inputs as an attempted solution for at least part of the given problem for an interaction presented during the interactive application, wherein a plurality of attempted solutions are received over a plurality of iterations of the process, and the program code to select the processed solution comprises program code that, when executed by the processor of the system, causes the system to:
- evaluate the plurality of attempted solutions; and
- select the processed solution based on the evaluation of the attempted solutions.

* * * * *